(12) United States Patent
Woodworth

(10) Patent No.: US 6,999,124 B2
(45) Date of Patent: Feb. 14, 2006

(54) METHOD FOR ORIENTING A DIGITAL IMAGE ON A DISPLAY OF AN IMAGE DISPLAY DEVICE

(75) Inventor: Duane A. Woodworth, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 32 days.

(21) Appl. No.: 10/299,384

(22) Filed: Nov. 19, 2002

(65) Prior Publication Data

US 2004/0095498 A1 May 20, 2004

(51) Int. Cl.
H04N 5/222 (2006.01)
G06K 9/32 (2006.01)
G09G 5/00 (2006.01)

(52) U.S. Cl. .................. 348/333.01; 345/649; 382/296
(58) Field of Classification Search ............ 348/222.1, 348/333.01, 333.03, 333.12, 583, 333.02; 345/649–659, 556, 173; 382/296
See application file for complete search history.

(56) References Cited

U.S. PATENT DOCUMENTS 5,798,750 A * 8/1998 Ozaki ........................ 345/656
5,914,748 A * 6/1999 Parulski et al. ............. 348/239
5,937,081 A * 8/1999 O'Brill et al. .............. 382/111
6,111,605 A * 8/2000 Suzuki ..................... 348/220.1
6,396,506 B1 * 5/2002 Hoshino et al. ............ 345/650
6,593,963 B1 * 7/2003 Safai ....................... 348/222.1

* cited by examiner

Primary Examiner—Thai Tran
Assistant Examiner—Kelly Jerabek
(74) Attorney, Agent, or Firm—Susan L. Parulski; David A. Novais

(57) ABSTRACT

A method of orienting a digital image for viewing on a display of a digital imaging device. The method comprises the steps of: accessing the digital image, the digital image being defined by a plurality of sides, each of the plurality of sides being substantially linear; displaying the digital image in a first orientation on the display of the digital imaging device, the display having a top edge; providing a selection member for selecting one of the plurality of sides; and automatically displaying the digital image in a second orientation responsive to the selecting of the one of the plurality of sides, the second orientation configured such that the selected one of the plurality of sides is disposed in a substantially horizontal orientation and is disposed closer to the top edge of the display than the other of the plurality of sides.

3 Claims, 6 Drawing Sheets

METHOD FOR ORIENTING A DIGITAL IMAGE ON A DISPLAY OF AN IMAGE DISPLAY DEVICE

FIELD OF THE INVENTION

The invention relates generally to the field of digital imaging, and in particular to the viewing of digital images on a digital imaging device.

BACKGROUND OF THE INVENTION

It is known to display and view digital images on a display of a digital imaging device, such as on a display of a digital camera or kiosk. When the digital image is displayed on the display, the digital image may not be properly oriented. That is, the digital image might be displayed upside down. For example, the content of a digital image might be a person, and the digital image might be oriented sideways on the display. Accordingly, the viewer would need to turn/twist their head in order to view the person in the proper orientation. Alternatively, many digital imaging devices allow the viewer to "rotate" the digital image. Such rotation is typically accomplished by displaying a "rotate picture" button on the display proximate the digital image which the viewer can select. Once selected, the digital image is typically rotated by 90 degrees. Since it is rotated only by 90 degrees, the viewer may need to select the "rotate picture" button several times. For example, if the picture is out of orientation by 180 degrees, the viewer must select the "rotate picture" button twice to properly orient the digital image on the display. Further, to indicate that the viewer has determined the proper orientation, the viewer must then typically select an "ok" or "done" button for the imaging device to continue its operations.

Accordingly, while such methods may have achieved certain degrees of success in their particular applications, there is a need to properly orient an image with minimal action by a viewer. Such a method should be intuitive so as to be appropriate for a casual user of a digital imaging device.

The present invention provides a method for orienting an image with minimal action by a viewer. The method is believed to be intuitive so as to be appropriate for a casual user of a digital imaging device.

SUMMARY OF THE INVENTION

An object of the present invention is to provide a method for need to orienting a digital image on a display of a digital imaging device.

Another object of the present invention is to provide such a method which can be accomplished with minimal action by a viewer.

A further object of the present invention is to provide such a method which is intuitive so as to be appropriate for a casual user of the digital imaging device.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a method of orienting a digital image for viewing on a display of a digital imaging device. The method comprises the steps of: accessing the digital image, the digital image being defined by a plurality of sides, each of the plurality of sides being substantially linear; displaying the digital image in a first orientation on the display of the digital imaging device, the display having a top edge; providing selection means for selecting one of the plurality of sides; and automatically displaying the digital image in a second orientation responsive to the selecting of the one of the plurality of sides, the second orientation configured such that the selected one of the plurality of sides is disposed in a substantially horizontal orientation and is disposed closer to the top edge of the display than the other of the plurality of sides.

According to another aspect of the invention, there is provided a method of orienting a digital image for viewing on a display of a digital imaging device, wherein the digital image has a curved shape comprised of a plurality of portions. The method comprises the steps of: accessing the digital image; displaying the digital image in a first orientation on the display of the digital imaging device, the display having a top edge; providing selection means for selecting one of the plurality of portions of the curved shape; and automatically displaying the digital image in a second orientation responsive to the selecting of the one portion, the second orientation configured such that the selected one of the plurality of portions is disposed closest to the top edge of the display.

According to yet another aspect of the invention, there is provided a method of orienting a digital image for viewing on a display of a digital imaging device, the boundary of the digital image being defined by a curved portion and a substantially linear portion. The method comprises the steps of: accessing the digital image; displaying the digital image in a first orientation on the display of the digital imaging device, the display having a top edge; providing selection means for selecting the curved or linear portion; determining whether the curved or linear portion was selected; and automatically displaying the digital image in a second orientation responsive to the selecting of the curved or linear portion. The second orientation is configured such that (1) if the curved portion was selected, the selected curved portion being disposed closer to the top edge of the display than the linear portion, or (2) if the linear portion was selected, the selected linear portion being disposed in a substantially horizontal orientation and positioned closer to the top edge of the display than the curved portion.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1A:
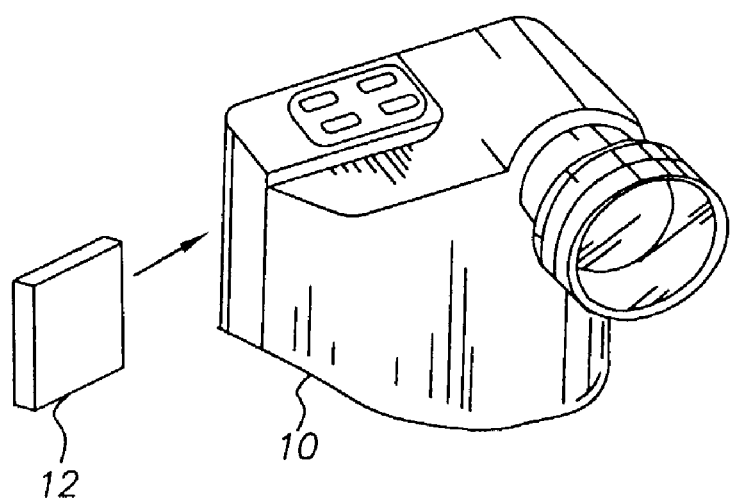
FIG. 1a shows a perspective view of a digital camera and memory card.

The following is a detailed description of the preferred embodiments of the invention, reference being made to the drawings in which the same reference numerals identify the same elements of structure in each of the several figures.

The method of the present invention is suitable for a digital imaging device, such as a kiosk, computer, a camcorder, a cellular phone having a display, digital video camera, digital camera, or the like.

Figure 1B:
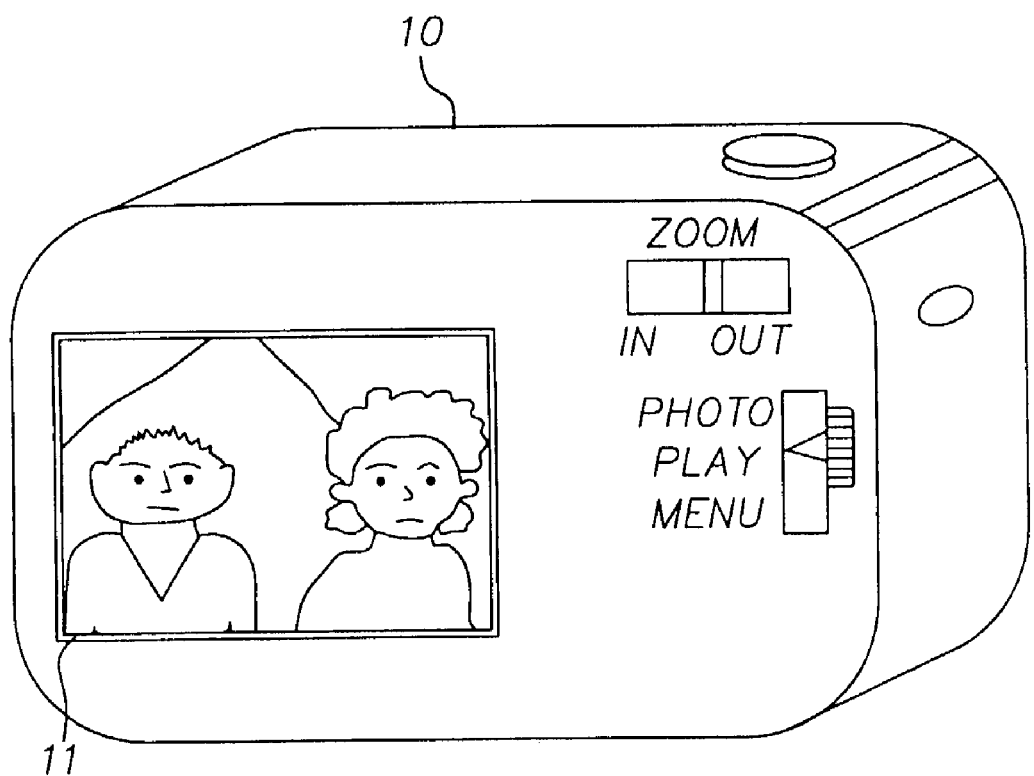
FIG. 1b shows a display of a digital camera.

FIGS. 1a and 1b show a digital imaging device configured as a digital camera 10. Digital camera 10 is adapted to capture images in electronic form and display the digital image on a display 11. The digital images are stored on a removable memory device such as a removable memory stick or card 12.

Figure 2:
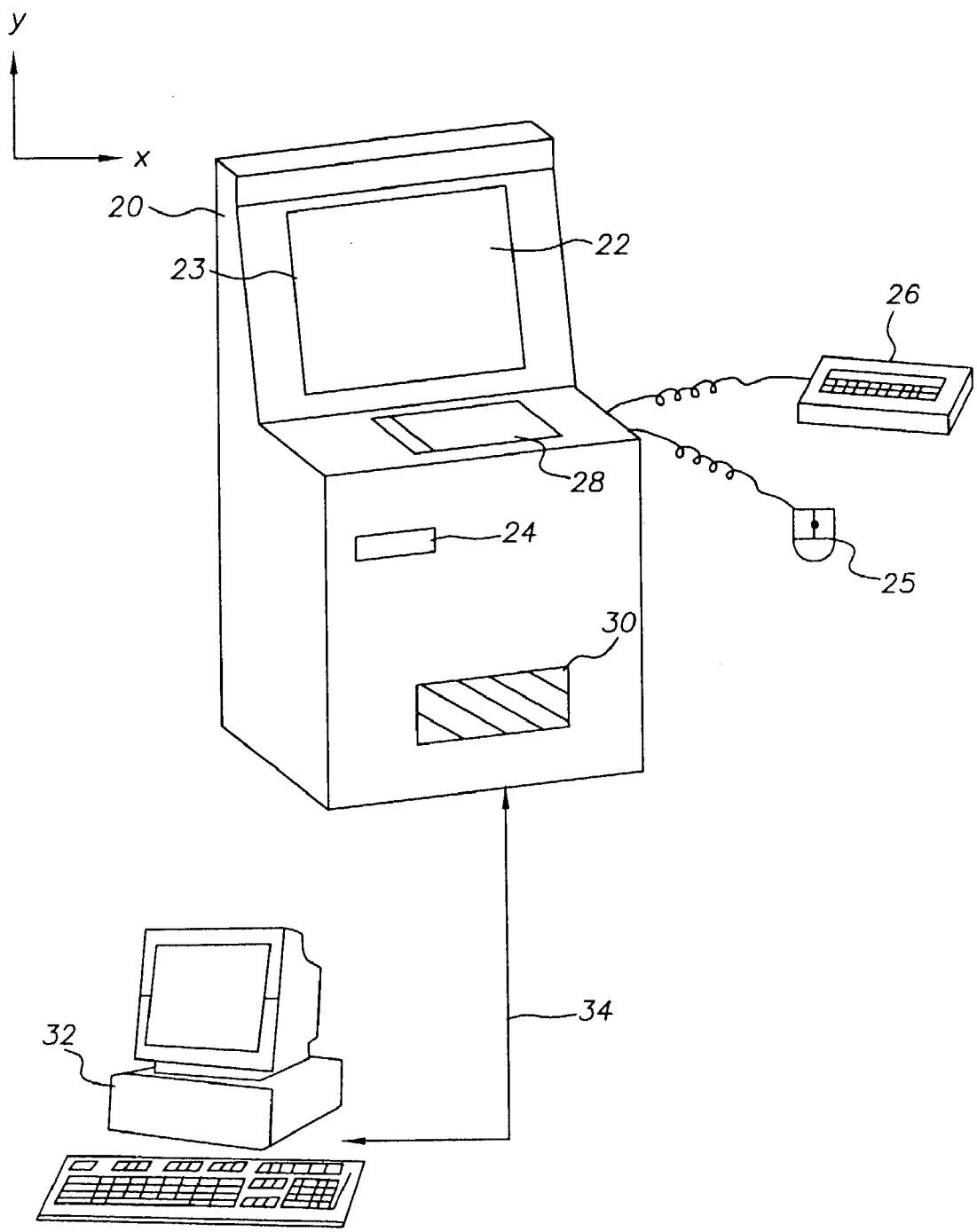
FIG. 2 shows a kiosk.

FIG. 2 shows a digital imaging device configured as a kiosk 20. For ease of discussion, the method of the present invention will be discussed with regard to a kiosk, though it is recognized that the method of the present invention can be employed by other digital imaging devices.

An example of kiosk 20 is a PICTURE MAKER™ kiosk produced by Eastman Kodak Company. Kiosk 20 includes a display 22 for displaying a digital image and an input port 24 adapted to receive a digital storage device such as a memory card, memory stick, media card, compact flash card, floppy disk, compact disc, PictureCD, or the like as known to those skilled in the art. Display 22 is preferably a touchscreen display, whereby a user can provide information and data to kiosk 20. Display 22 includes a top edge 23, which is oriented along the x-axis at the further y-axis position. A user's finger, mouse, light pen, stylus, or other input device can be employed to touch display 22 to provide information/data. An input device of a mouse 25 is generally illustrated in FIG. 2. A keyboard 26 can be used to provide information and data. Kiosk 20 can optionally include a scanner 28 for receiving a user-supplied visual image (i.e., a hard copy image) and converting the visual image into digital form stored in a digital file. Kiosk 20 further shows an optional delivery section 30 controlling the delivery of a medium. Delivery section 30 is illustrated in FIG. 2 as an opening in kiosk 20. A digital file comprising a digital image can be transmitted to/from kiosk 20 from/to another display device, a server, digital minilab, wholesale lab, remote computer or other digital device 32 over a communication network 34.

Figure 3:
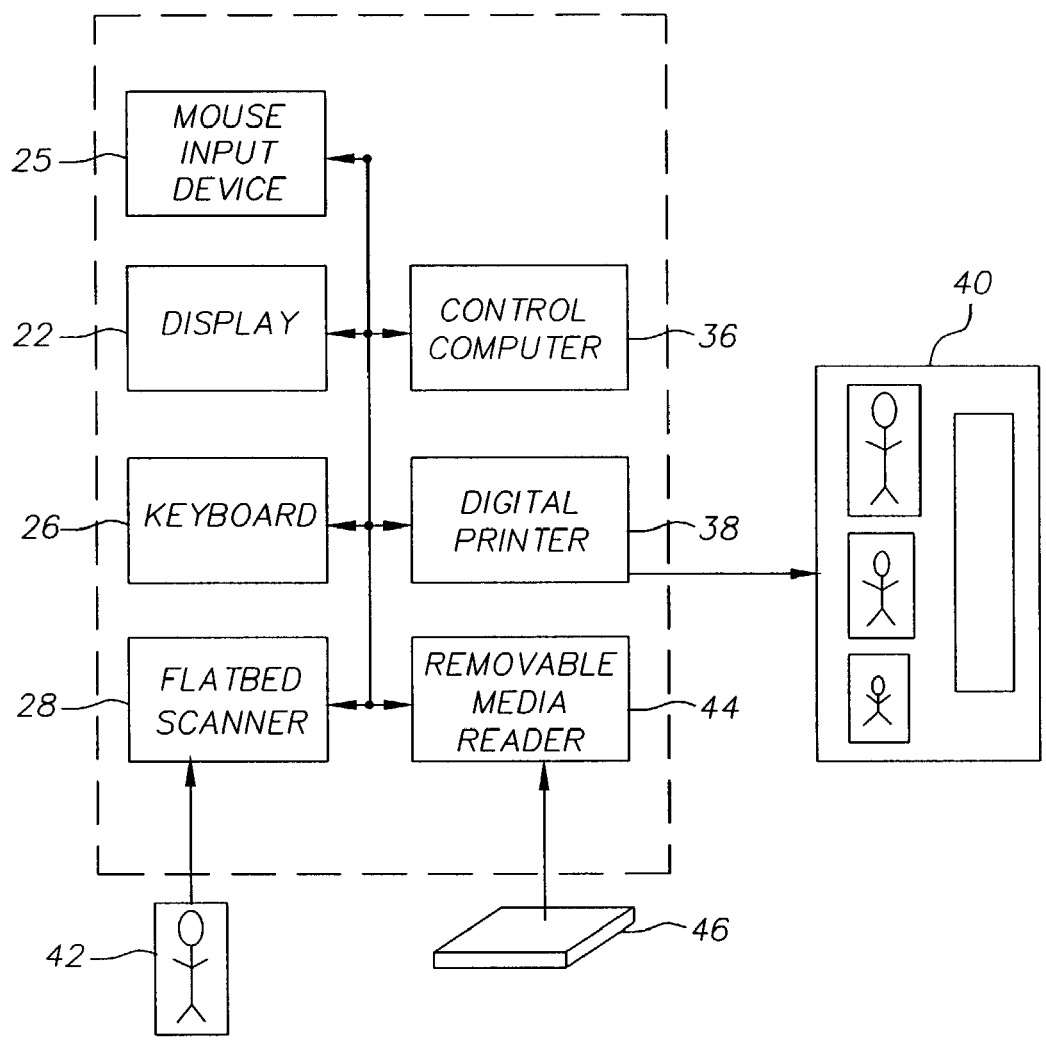
FIG. 3 shows a diagram of included functions of the kiosk of FIG. 2.

FIG. 3 generally shows a diagram of included functions of kiosk 20. As illustrated, kiosk 20 can include keyboard 26, mouse 25, and scanner 28. A computer 36 typically manages the flow of information and functionality of the components of kiosk 20. Internal to kiosk 20 can be a printer 38, an example of which is the Kodak Digital Science Model 8650 manufactured by Eastman Kodak Company. Printer 38 responds to commands of computer 36 for forming an image on a medium such as thermal or ink-jet paper. An example of an output image is illustrated in FIG. 3 at 40 formed from an input image 42. One method of receiving a digital image is illustrated by a removable media reader 44 disposed internal to input port 24 for receiving removable media 46, for example, a memory card, floppy disk, compact disc, PictureCD, or other form of removable media used in transferring digital files.

The PICTURE MAKER™ kiosk produced by Kodak allows a user to manipulate the digital image displayed on display 22. For example, a user can rotate the digital image, zoom and crop the digital image, and correct artifacts present in the digital image (for example, red eye).

As discussed above, the digital image displayed on display 22 might not be properly oriented for the content of the digital image. The present invention provides a method of orienting a digital image for viewing on a display of a digital imaging device.

Figure 4:
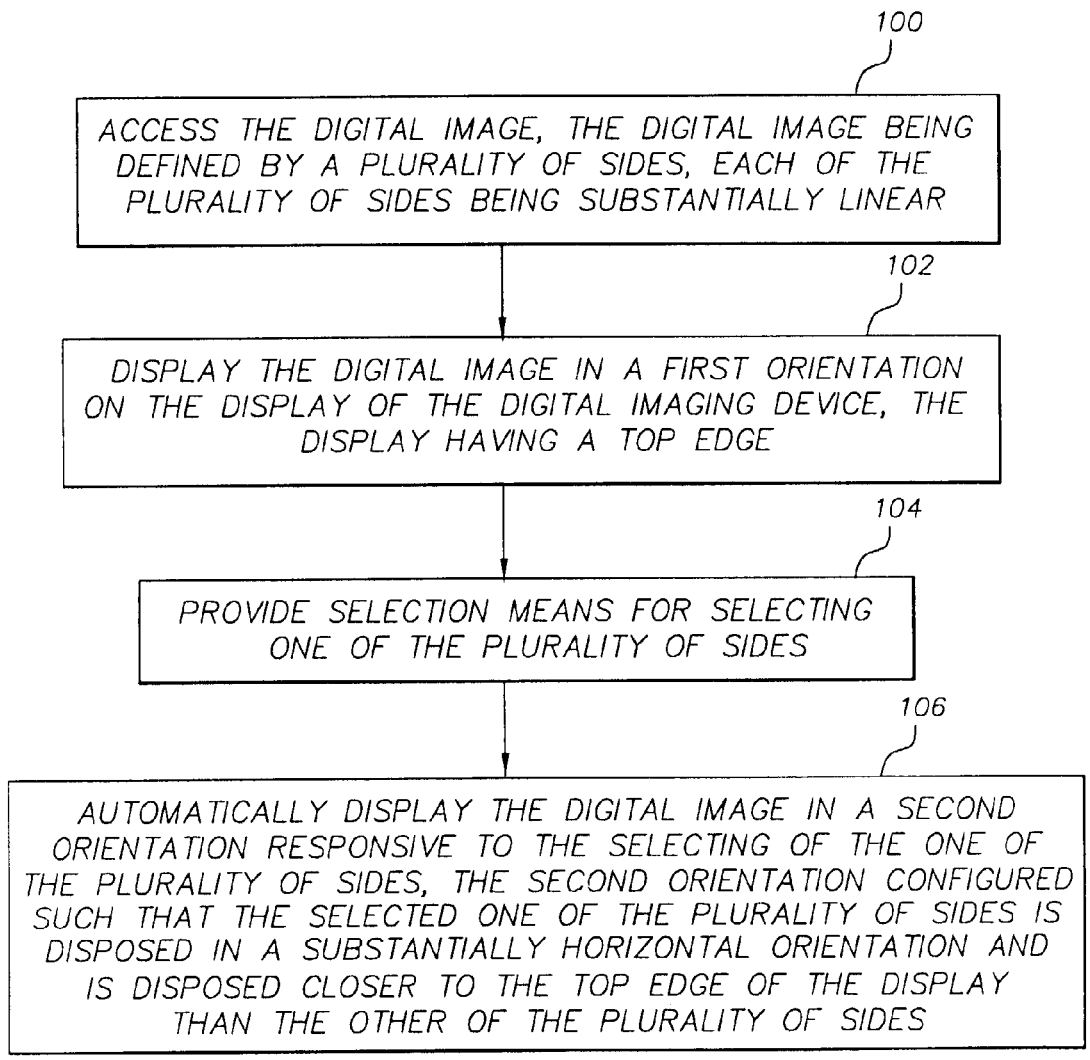
FIG. 4 shows a flow diagram of the method in accordance with the present invention.

FIG. 4 shows a flow diagram of the method in accordance with the present invention employing a digital imaging device including a display having a top edge. At step 100, the digital image is accessed, with the digital image being defined by a plurality of sides. That is, the area/outline/boundary of the digital image is defined by a plurality of sides. In the present invention, each of the plurality of sides is substantially linear. At step 102, the digital image is displayed in a first orientation on the display of the digital imaging device. At step 104, selection means are provided for selecting one of the plurality of sides. At step 106, the digital image is automatically displayed in a second orientation responsive to the selecting of the one of the plurality of sides, the second orientation configured such that the selected one of the plurality of sides is disposed in a substantially horizontal orientation and is disposed closer to the top edge of the display than the other of the plurality of sides.

Figure 6:
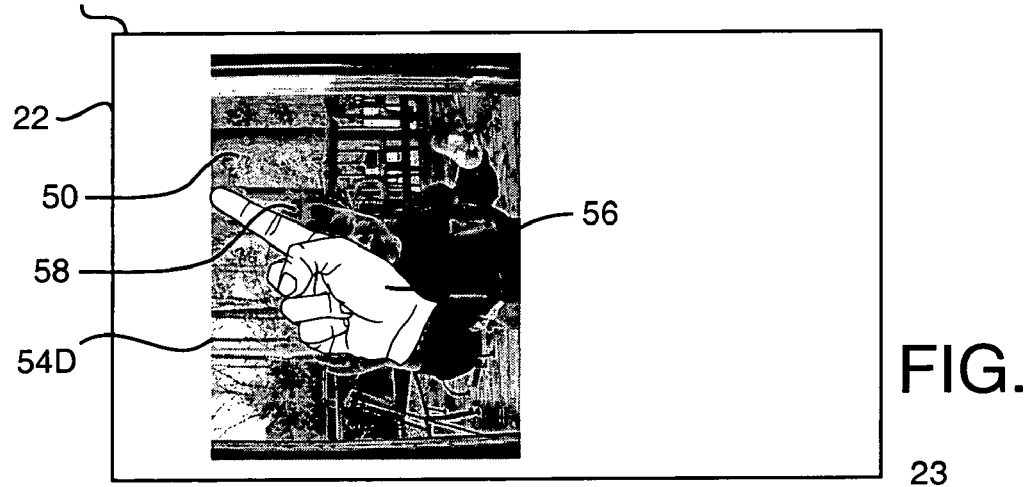
FIG. 6 shows a selection means selecting one edge of the displayed image of FIG. 6.
Figure 7:
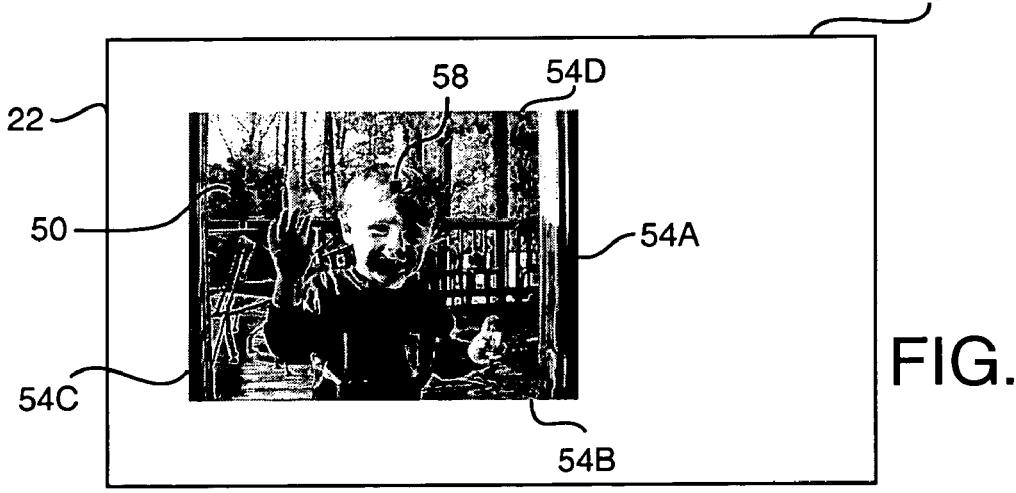
FIG. 7 shows the display displaying the image in a second orientation in response to the selection of one of the edges.

The method is now more particularly described with reference to an example illustrated in FIGS. 5 through 7. Display 22 of kiosk 20 is displayed in FIGS. 5–7. Display 22 includes an image area 50 adapted to display an image. Display 22 can also include an instruction area 52 adapted to display instructions or other textual information for a viewer.

At step 100, a digital image is accessed. The access of the digital image can be by methods known to those skilled in the art, for example, accessing a digital file from removable media 46 or employing scanner 28 to scan a hardcopy print.

Figure 5:
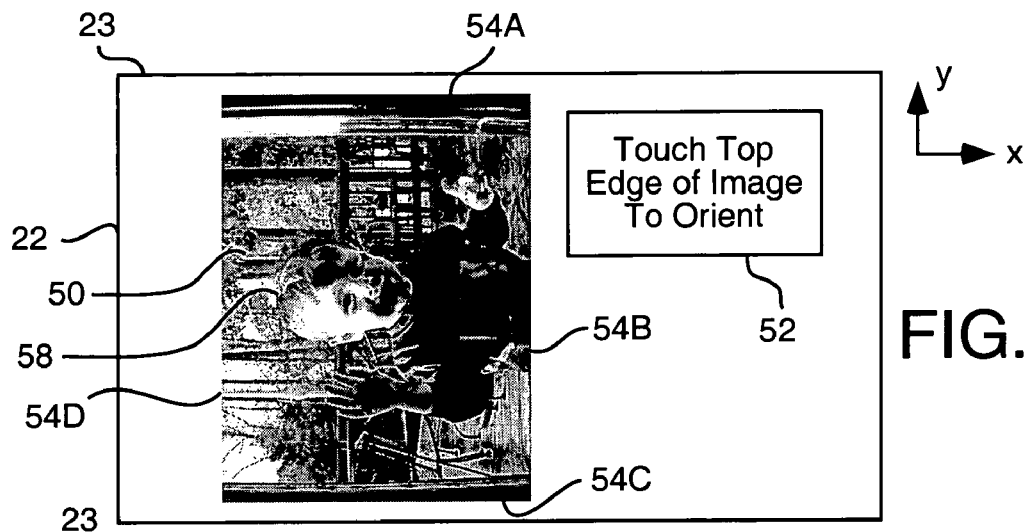
FIG. 5 shows a display displaying an image in a first orientation.

At step 102, the accessed digital image is displayed in image area 50 on display 22 in a first orientation, as shown in FIG. 5. As displayed, the first orientation is not a proper orientation for the content of the displayed image. For the example shown in FIG. 5, the young child is displayed sideways. Therefore, it is desirable to re-orient the display image.

The digital image is defined by a plurality of sides 54A, 54B, 54C, 54D. Each of the plurality of sides is substantially linear. In FIG. 5, side 54A is disposed closest to top edge 23.

At step 104, selection means are provided for selecting one of the plurality of sides. If display 22 is a touchscreen, the viewer can employ their hand/finger to touch one of the plurality of sides. In FIG. 6, a finger 56 is illustrated as selecting side 54D. If display 22 is not a touchscreen, keyboard 26 can be employed to move a cursor, crosshairs, or other indicator to overlay one of the sides to indicate selection. Still further, mouse 25 can be used to indicate/click one of the plurality of sides. Other means/methods may be known to select one of the sides.

The information regarding which side was selected is transmitted to computer 36. For example, the information can be transmitted to computer 36 as a mouse click.

Once the side is selected and the information transmitted to computer 36, computer 36 processes the information to determine a second orientation of the digital image. Thereafter, the digital image is automatically displayed on display 22 in a second orientation. As such, the re-displaying of the digital image is responsive to the selecting of the one of the plurality of sides. FIG. 7 shows the digital image displayed in the second orientation. The second orientation is configured such that the selected side (i.e., 54D) is disposed in a substantially horizontal orientation and is disposed closer to top edge 23 than the other (non-selected) sides. As shown in FIG. 7, the image is now displayed such that side 54D is substantially horizontal, and is disposed above the other (non-selected) sides. As such, the image is in the proper orientation for viewing by the viewer.

It is noted that if the selected side is already closest to top edge 23 (i.e., the selected side is already on top), the second orientation will be the same as the first orientation. That is, there is no change to the displaying of the digital image on display 22.

It is noted that the digital image does not need to be of a rectangular or parallelogram shape. Other shapes can be employed by the method of the present invention wherein the shapes have substantially linear sides, for example, hexagonal, triangular, square, or the like.

If digital image has a triangular shape, the user could select one of the sides, whereby the triangle would be rotated until the selected side has a substantially horizontal orientation closest to top edge 23. Alternatively, the triangular image could be rotated (preferably clockwise) until one of the ends of the selected side is positioned closest to top edge 23. Still further, if the intersection point of two sides is selected rather than one of the sides, the second orientation would be determined by rotating the triangular image (clockwise or counterclockwise) until the intersection point is positioned closed to top edge 23.

In the preferred embodiment, described above, the digital image has a shape having substantially linear sides. However, it is recognized that the method of the present invention can be employed with digital images having at least one non-linear side, that is, a side having a curved shape.

For example, the method of the present invention can be employed for digital images having an elliptical, oval, or circular shape (i.e., a shape comprised of curves). That is, the area defined by the digital image has a curved shape 58 shown in FIGS. 5–7. For such a shape, the curved digital image would be rotated until the location indicated/touched on the curve is positioned closest to top edge 23. More particularly, to orient a circular shaped digital image for viewing display 22 on digital imaging device 20, first, the digital image would be accessed. Then, the digital image would be displayed in a first orientation on display 22, wherein display 22 has a top edge. Digital imaging device 20 would include selection means for selecting one portion of the circular shape. Then, the digital image would automatically be displayed in a second orientation responsive to the selecting of the one portion, wherein the second orientation is configured such that the selected one portion is positioned closest to the top edge of the display.

If the digital image has a shape comprised of curved and non-curved segments, computer 36 can determine, using means known to those skilled in the art, whether the selected segment of the shape is curved or non-curved. Then, if the selected segment is curved, the shape can be rotated until the selected segment is positioned closed to top edge 23. If the selected segment is non-curved, the shape can be arranged such that the selected segment is substantially horizontal and positioned closest to top edge 23.

Figure 8:
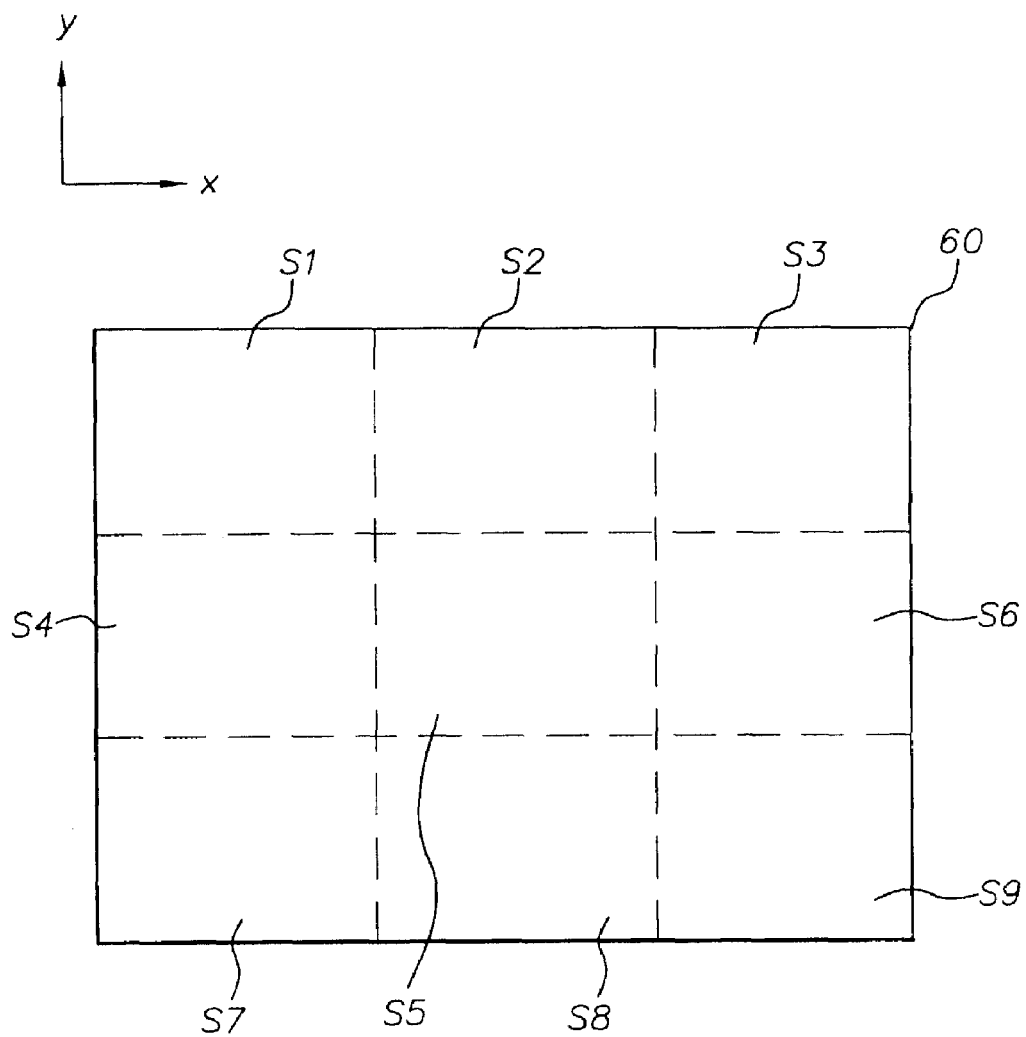
FIG. 8 shows provides an example of implementing the present invention wherein the digital image has a plurality of selection areas and non-selection areas.

FIG. 8 provides an example of the implementation of the method in accordance with the present invention. FIG. 8 shows a digital image 60 having a rectangular shape. An x,y coordinate system is referenced with x being the width and y being height. In a preferred arrangement, the width x and height y is divided into three. As such, digital image 60 is segmented into a plurality of selection areas S1 through S9. If the user selects (i.e., touches or mouse clicks) within selection areas S2, S4, S6, or S8, then a side is "selected". The other selection areas are considered to be "dead" areas. That is, if the user selects (i.e., touches or mouse clicks) any other selection area (i.e., S1, S3, S5, S7, or S9), then no side is considered to be selected. As such, no action would be taken, and no second orientation would be displayed.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10 digital camera
11 display; digital camera
12 removable memory
20 kiosk
22 display; kiosk
23 top edge
24 input port
25 mouse; input device
26 keyboard
28 scanner
30 delivery section
32 digital device
34 communication network
36 computer
38 printer
40 output image
42 input image
44 media reader
46 removable media
50 image area
52 instruction area
54 sides
58 curved shape
56 selection means; finger/hand
60 digital image

What is claimed is:

1. A method of orienting a digital image for viewing on a display of a digital imaging device wherein the orientation of the content of the digital image is not known, the digital image having a curved shape comprised of a plurality of portions, the method comprising the steps of:

accessing the digital image;

displaying the digital image in a first orientation on the display of the digital imaging device, the display having a top edge;

providing selection means for selecting a portion of the displayed digital image proximate one of the plurality of portions of the curved shape; and automatically displaying the digital image in a second orientation responsive to the selecting of the one portion, the second orientation configured such that the selected one of the plurality of portions is disposed closest to the top edge of the display.

2. A method of orienting a digital image for viewing on a display of a digital imaging device, the boundary of the digital image being defined by a curved portion and a substantially linear portion, the method comprising the steps of:

accessing the digital image;

displaying the digital image in a first orientation on the display of the digital imaging device, the display having a top edge;

providing selection means for selecting the curved or linear portion;

determining whether the curved or linear portion was selected; and automatically displaying the digital image in a second orientation responsive to the selecting of the curved or linear portion, the second orientation being configured such that (1) if the curved portion was selected, the selected curved portion being disposed closer to the top edge of the display than the linear portion, or (2) if the linear portion was selected, the selected linear portion being disposed in a substantially horizontal orientation and positioned closer to the top edge of the display than the curved portion.

3. A method of orienting a digital image having a plurality of sides, for viewing the digital image on a display provided with a top edge, the method comprising the steps of:

(a) accessing the digital image;

(b) displaying the digital image in a first orientation on the display which is not a proper orientation of such displayed image, and so that only one of the sides of the displayed image is closest to the ton edge of the display;

(c) selecting one of the plurality of sides of the displayed image which is not the one side of the displayed image that is closest to the ton edge of the display, by overlaying a visible object on the selected side of the displayed image; and (d) determining a second orientation of the displayed image, using an indication of the selected side of the displayed image, which is the proper orientation of the displayed image, and so that the selected side of the displayed image would be closest to the toy edge of the display, and re-displaying the displayed image in the second orientation;

wherein the selected side of the displayed image is proximate a curved portion of the displayed image intended to be viewed opposite the top edge of the display.

* * * * *